United States Patent
Park et al.

(10) Patent No.: US 8,896,788 B2
(45) Date of Patent: Nov. 25, 2014

(54) LIQUID CRYSTAL DISPLAY

(71) Applicant: LG Display Co., Ltd., Seoul (KR)

(72) Inventors: Sungyong Park, Gyeonggi-do (KR); Yeonchae Hong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 188 days.

(21) Appl. No.: 13/729,271

(22) Filed: Dec. 28, 2012

(65) Prior Publication Data
US 2013/0229597 A1 Sep. 5, 2013

(30) Foreign Application Priority Data
Mar. 5, 2012 (KR) .................... 10-2012-0022473

(51) Int. Cl.
*G02F 1/1335* (2006.01)
*G06F 3/038* (2013.01)

(52) U.S. Cl.
CPC ............ *G02F 1/133603* (2013.01); *G02F 2001/133612* (2013.01)
USPC ........................................... 349/69; 345/206

(58) Field of Classification Search
CPC ............... G02F 1/133603; G02F 1/133615; G02F 2001/133607; G02F 1/13452; G09G 2300/0408; H05K 3/361
USPC ............................................. 349/69; 345/206
See application file for complete search history.

(56) References Cited

U.S. PATENT DOCUMENTS

| | | | |
|---|---|---|---|
| 2005/0007516 A1* | 1/2005 | Hong et al. | 349/64 |
| 2011/0084956 A1* | 4/2011 | Choi et al. | 345/212 |
| 2012/0092581 A1* | 4/2012 | Kweon et al. | 349/58 |
| 2012/0127214 A1* | 5/2012 | Han et al. | 345/690 |

* cited by examiner

*Primary Examiner* — Mike Qi
(74) *Attorney, Agent, or Firm* — Morgan, Lewis & Bockius LLP

(57) ABSTRACT

A liquid crystal display comprises a display module comprising a liquid crystal panel and an LED array providing light to the liquid crystal panel, a connection board comprising a first transistor part for driving a part of the LED array, and a driver board comprising a second transistor part for driving another part of the LED array and first and second driving parts that control the second transistor part and the first transistor part formed on the connection board.

10 Claims, 9 Drawing Sheets

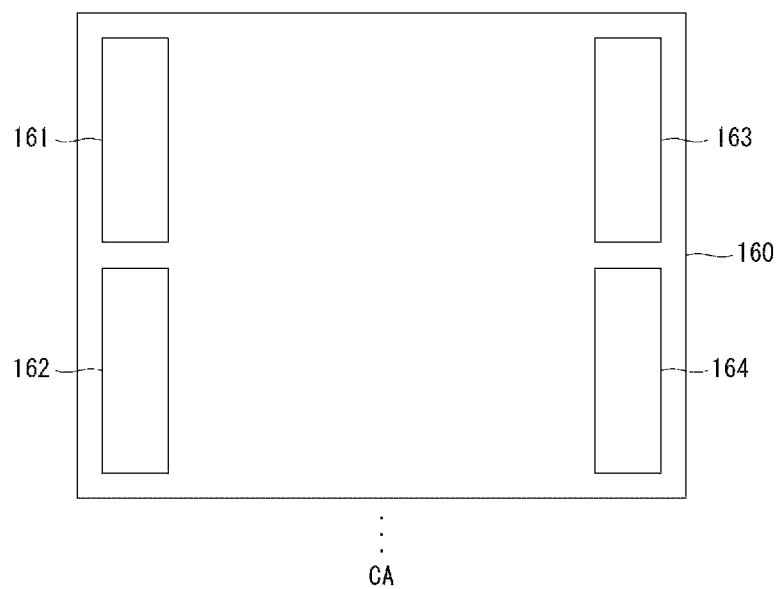
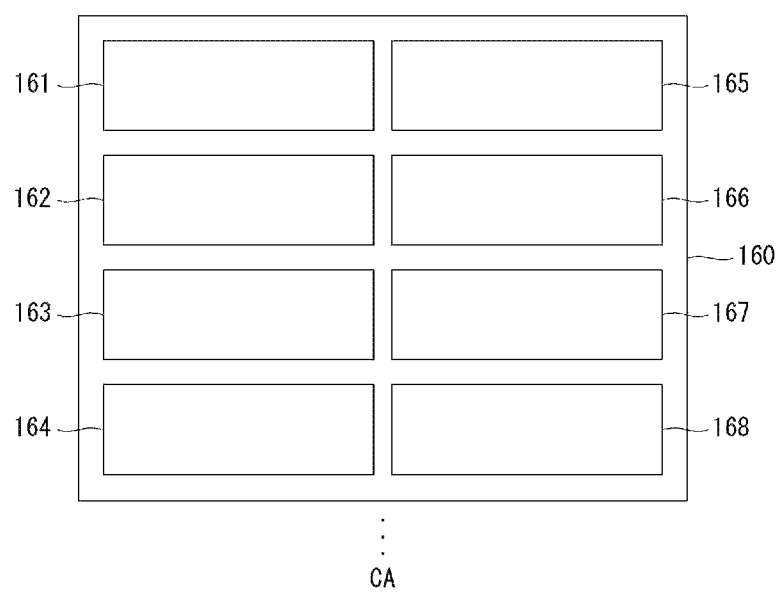

LIQUID CRYSTAL DISPLAY

This application claims the benefit of Korean Patent Application NO. 10-2012-0022473 filed on Mar. 05, 2012, which is incorporated herein by reference for all purposes as if fully set forth herein.

BACKGROUND

1. Field
This document relates to a liquid crystal display.

2. Related Art
With the development of information technology, display devices have been widely used as a connection medium between a user and information. Hence, the use of flat panel displays such as a liquid crystal display (LCD), an organic light emitting diode (OLED) display, a plasma display panel (PDP) has been increasing. Out of the flat panel displays, because the liquid crystal displays can achieve a high resolution and can be manufactured as a large-sized display as well as a small-sized display, they have been widely used.

A liquid crystal display comprises a liquid crystal panel comprising a liquid crystal layer which is positioned between a transistor substrate having a transistor, a storage capacitor, a pixel electrode, and the like and a color filter substrate having a color filter, a black matrix, and the like.

In the liquid crystal display, when a gate signal is supplied from a gate driver, the liquid crystal layer is driven by a difference between a data voltage supplied from a data driver and a common voltage supplied from a power supply, whereby light incident form a backlight unit is adjusted, thereby displaying an image.

The backlight unit providing light to the liquid crystal panel may be implemented in various forms including an edge type backlight unit in which a light source is positioned on an edge and a direct-type backlight unit in which a light source is positioned under the liquid crystal panel.

A light emitting diode (hereinafter, LED), rather than a fluorescent lamp, is mainly used as the light source of the backlight unit. This is because the LED has many advantages including lower power consumption than fluorescent lamps, easiness of driving, various forms of arrangement, and so on. The LED is driven by a driver comprising a transistor. The driver driving the LED is always mounted on a driver board.

A conventional method using this structure is based on the basic concept of having to control the voltage and current of the LED in the driver board. According to this method, the driver of the transistor driving the LED is mounted on the driver board. Hence, this method faces the difficulty of having to design and develop a new driver board each time the structure of the backlight unit is changed (such as an increase or decrease in the number of blocks of the LED), and a solution for this problem is required.

SUMMARY

An exemplary embodiment of the present invention provides a liquid crystal display comprising: a display module comprising a liquid crystal panel and an LED array providing light to the liquid crystal panel; a connection board comprising a first transistor part for driving a part of the LED array; and a driver board comprising a second transistor part for driving another part of the LED array and first and second driving parts that control the second transistor part and the first transistor part formed on the connection board.

In another aspect, an exemplary embodiment of the present invention provides a liquid crystal display comprising: a display module comprising a liquid crystal panel and an LED array providing light to the liquid crystal panel; a first connection board comprising a first transistor part for driving a part of the LED array; a second connection board comprising a second transistor part for driving another part of the LED array; and a driver board comprising first and second driving parts that control the first and second transistor parts formed on the first and second connection boards.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7 is an illustration of the arrangement of a dual type LED array;

FIG. 8 is an illustration of the arrangement of a direct type LED array;

DETAILED DESCRIPTION

Reference will now be made in detail embodiments of the invention examples of which are illustrated in the accompanying drawings.

Hereinafter, a concrete embodiment of the present invention will be described with reference to the accompanying drawings.

Figure 1:
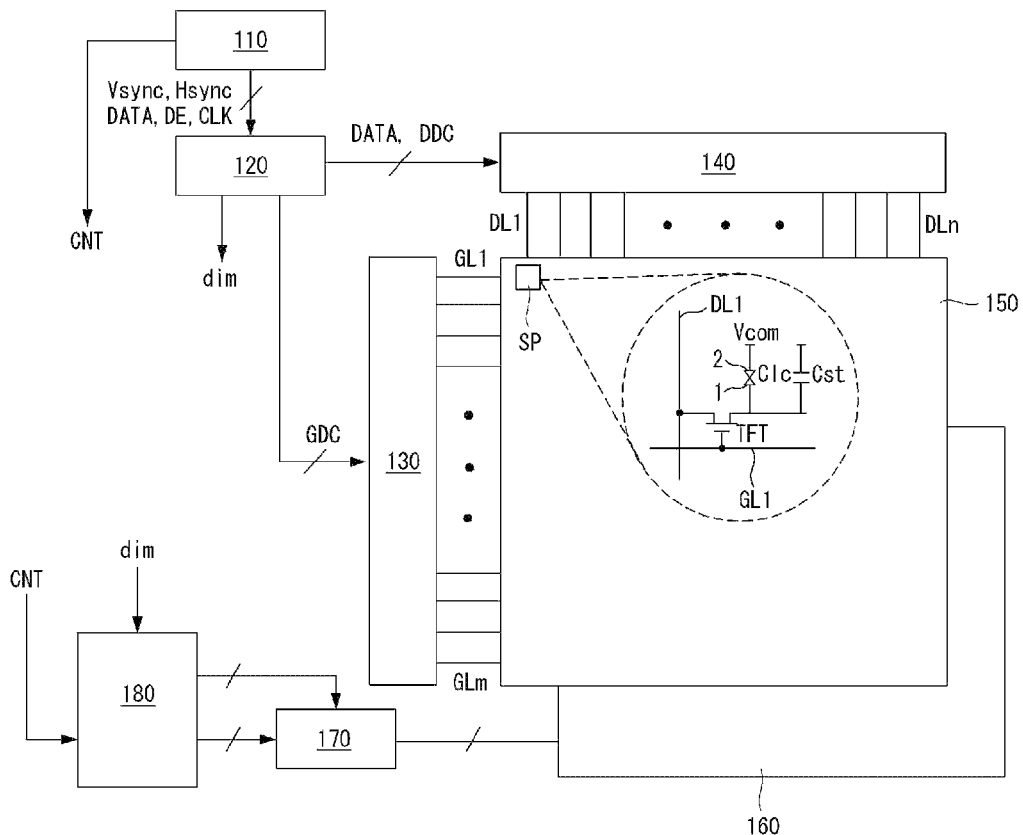
FIG. 1 is a schematic block diagram of a liquid crystal display.
Figure 2:
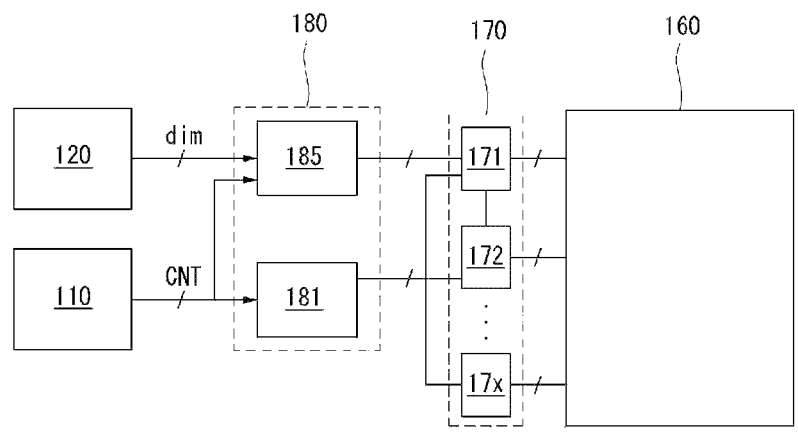
FIG. 2 is a schematic block diagram of a backlight unit shown in FIG. 1.

As shown in FIGS. 1 and 2, a liquid crystal display comprises an image processor 110, a timing controller 120, a gate driver 130, a data driver 140, a liquid crystal panel 150, an LED array 160, an LED driver 170, and N LED controller 180. The LED array 160, the LED driver 170, and the LED controller 180 are included in a backlight unit providing light to the liquid crystal panel 150.

The image processor 110 performs image processing on a data signal DATA supplied form an external source into an image. The image processor 110 supplies, along with the image-processed data signal, a vertical synchronization signal Vsync, a horizontal synchronization signal Hsync, a data enable signal DE, and a clock signal CLK to the timing controller 120. Also, the image processor 110 outputs an LED control signal CNT for controlling the LED controller 180.

The timing controller 120 controls operation timings of the data driver 140 and the gate driver 130 using timing signals such as the vertical synchronization signal Vsync, horizontal synchronization signal Hsync, data enable signal DE, and clock signal CLK supplied from the image processor 110. Also, the timing controller 120 outputs a dimming control signal dim for controlling the brightness of the LED array 160.

Since the timing controller 120 can determine a frame period by counting data enable signals DE of 1 horizontal period, the vertical synchronization signal and the horizontal synchronization signal, which are supplied from an external source, can be omitted. The timing controller 120, along with the gate driver 130 and the data driver 140, generates control signals GDC and DDC for driving the liquid crystal panel 150. The control signals GDC and DDC comprise a gate timing control signal GDC for controlling the operation timing of the gate driver 130 and a data timing control signal DDC for controlling the operation timing of the data driver 140.

The liquid crystal panel 150 comprises sub-pixels comprising a liquid crystal layer positioned between a transistor substrate (hereinafter, a TFT substrate) and a color filter substrate. The TFT substrate comprises a data line, a gate line, a TFT, a storage capacitor, and the like. The color filter substrate comprises a black matrix, a color filter, and the like.

A polarizer is attached to the TFT substrate and color filter substrate of the liquid crystal panel 150, and an alignment layer for setting a pre-tilt angle of liquid crystal is formed thereon.

A sub-pixel SP is defined by a data line DL1 and a gate line GL1 which cross each other. The sub-pixel SP comprises a TFT driven by a gate signal supplied through the gate line SL1, a storage capacitor Cst for storing a data signal supplied through the data line DL1 as a data voltage, and a liquid crystal cell Clc driven by the data voltage stored in the storage capacitor Cst.

The liquid crystal cell Clc is driven by the data voltage supplied to a pixel electrode 1 and a common voltage VCOM supplied to a common electrode 2. The common electrode 2 is formed on the color filter substrate in a vertical field driving mode such as a Twisted Nematic (TN) mode and a Vertical Alignment (VA) mode. The common electrode 2 and the pixel electrode 1 are formed on the TFT substrate in a horizontal field driving mode such as an In Plane Switching (IPS) mode and a Fringe Field Switching (FFS) mode. A liquid crystal mode of the LCD panel PNL can be formed by any liquid crystal mode as well as the above TN mode, the VA mode, the IPS mode, and the FFS mode.

The data driver 140 converts the data signal DATA supplied from the timing controller 120 into data in parallel data format by sampling and latching the data signal DATA in response of the data timing control signal DDC supplied from the timing controller 120. The data driver 140 converts the data signal DATA into a gamma reference voltage. The data driver 140 supplies the data signal DATA through data lines DL1 to DLn connected to the sub-pixels included in the liquid crystal panel 150. The data driver 140 is formed on an external substrate in the form of an integrated circuit IC.

The LED array 160 provides light to the liquid crystal panel 150. The LED array 160 consists of LEDs (Light Emitting Diodes). The LED array 160 is formed as an edge type, a dual type, or a direct type. In the edge type, LEDs are disposed on one side of the liquid crystal panel 150. In the dual type, LEDs are disposed on both sides of the liquid crystal panel 150. In the direct type, LEDs are disposed on a lower surface of the liquid crystal panel 150.

The LED driver 170 drives the LED array 160. The LED driver 170 consists of a first LED driver 171 through an Xth LED driver 17X (X is an integer equal to or greater than 4) according to the number of LED blocks included in the LED array 160.

The LED controller 180 controls the LED driver 170.

The LED controller 180 comprises a PWM (Pulse Width Modulation) unit 181 and an MCU (Micro Control unit) 185. The PWM unit 181 and the MCU 185 may be either integrated as a single unit or apart as separate units.

The PWM unit 181 performs duty control for controlling the brightness of the LED array 160 based on an LED control signal CNT supplied from the image processor 110. Also, the PWM unit 181 generates and outputs electric power to be supplied to the LED array 160, and controls output power. The MCU 185 controls the LED driver 170 so that the LED array 160 performs local dimming in response to a dimming control signal dim supplied from the timing controller 120.

Hereinafter, a transistor part and a driving part, and channel control of the transistor part by means of the driving part will be described.

Figure 3:
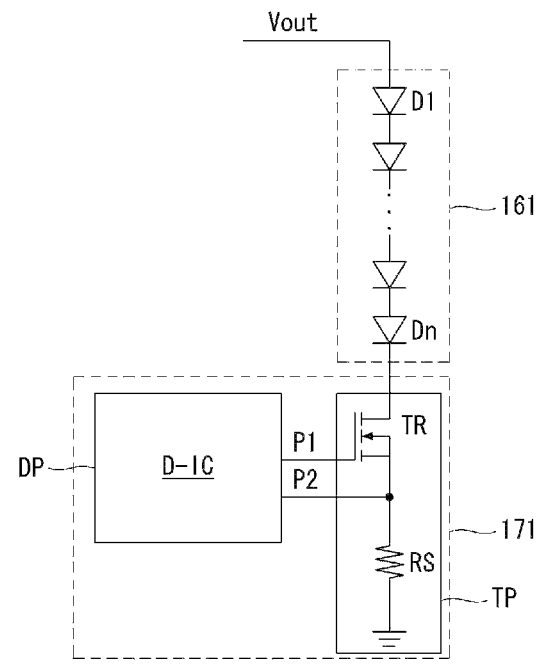
FIG. 3 is a first illustration of a transistor part and a driving part shown in FIG. 2.

As shown in FIG. 3, a transistor driving part DP and a transistor part TP have a 2-pin connection line structure. With this 2-pin connection line structure, the transistor driving part DP can drive a transistor TR through a pin connected to a gate electrode of the transistor TR, and detect short-circuiting of a first LED array 161. This structure will be described below.

The first LED array 161 consists of LEDs D1 to Dn connected in a serial string. The first LED array 161 is driven to emit light by the first LED driver 171. Although the first LED array 161 consists of a string in the drawings by way of example, the first LED array 161 may also consist of M strings (M is an integer equal to or greater than 2) depending on the configuration of the backlight unit.

The first LED driver 171 comprises a transistor TR for driving the first LED array 161, a transistor part TP comprising a passive element RS, and a transistor driving part DP comprising a driver IC D-IC for driving the transistor part TP.

The transistor TR for driving the first LED array 161 may be, for example, a FET or BJT, and the passive element RS may be, for example, a resistor.

The transistor driving part DP outputs a gate signal in PWM format through a first pin P1 connected to the gate electrode of the transistor TR. The transistor TR performs gate ON/OFF in response to a gate signal and causes the first LED array 161 to emit light.

The transistor driving part DP is able to detect short-circuiting of the first LED array 161 through the first pin P1. Accordingly, the transistor driving part DP functions to protect an element connected to a given node depending on whether the first LED array 161 is short-circuited or not. The transistor driving part DP is able to control the current flowing through the first LED array 161 and the transistor TR through a second pin P2 connected to a node between the transistor TR and the passive element RS.

Figure 4:
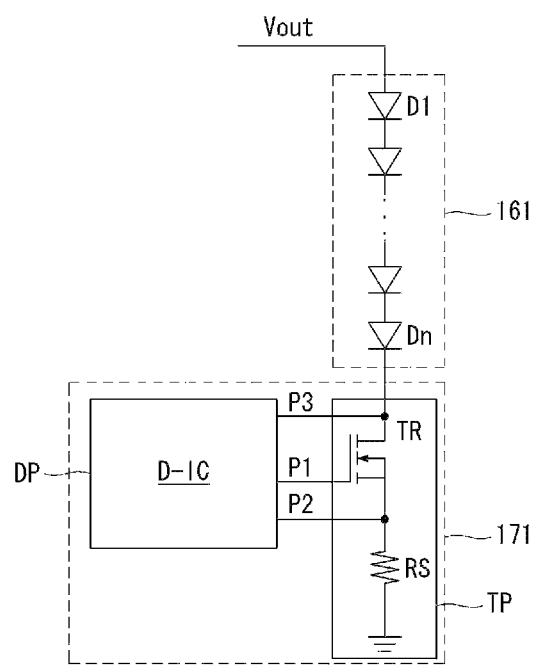
FIG. 4 is a second illustration of the transistor part and the driving part shown in FIG. 2.

As shown in FIG. 4, the transistor part TP of the transistor driving part DP has a 3-pin connection line structure. With this 3-pin connection structure, the transistor driving part DP drives the transistor TR through a first pin P1 connected to the gate electrode of the transistor TR.

The transistor driving part DP controls the current flowing through the first LED array 161 and the transistor TR through a second pin P2 connected to a node between the transistor TR and the passive element RS.

The transistor driving part DP is able to detect short-circuiting of the first LED array 161 through a third pin P3 connected to a node between the first LED array 161 and the transistor TR. Also, the transistor driving part DP functions to protect an element connected to a given node depending on whether the first LED array 161 is short-circuited or not.

As explained in FIGS. 3 and 4, the 2-pin or 3-pin connection line structure may be selected depending on the structure of the transistor driving part DP and the transistor part TP.

Figure 5:
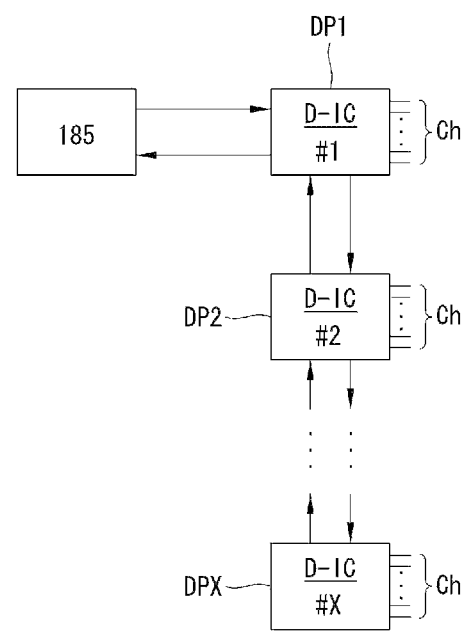
FIG. 5 is a view for explaining channel control of the transistor part by means of the driving part.

As shown in FIG. 5, although first through Xth transistor driving parts DP1 to DPx also can drive a plurality of transistor parts, the number of transistor parts that can be controlled by these driving parts, that is, the number of channels Ch, is limited.

The MCU 185 controls the plurality of transistor driving parts DP1 to DPx. Since the MCU 185 controls the first to Xth transistor driving parts DP1 to DPx using a serial communication protocol, for example, I2C protocol, the number of objects to be controlled is more flexible than the number of transistor driving parts.

Firmware for driving the transistor driving part DP is incorporated in the MCU 185. The firmware stored in the MCU 185 comprises the current, duty, turn on/off, and channel control information of the transistor driving part D. Accordingly, some part of channels of a particular transistor driving part may be used or not depending on the firmware setting of the MCU 185.

Conventionally, the transistor driving part DP and transistor TP explained in FIGS. 3 and 4 are mounted on the same driver board. With this method, however, it is necessary to design and develop a new driver board each time the structure of the backlight unit is changed (such as an increase or decrease in the number of LED blocks).

In an exemplary embodiment of the present invention, the driving part DP and some part of the transistor part TP are formed on different boards in order to solve the foregoing problem and increase shared use of the device. Even with this, the use of a channel can be controlled in accordance with an increase or decrease in the number of channels Ch of the transistor driving part DP by changing the firmware of the MCU 185.

Hereinafter, the concept of the exemplary embodiment will be described in more detail.

Figure 6:
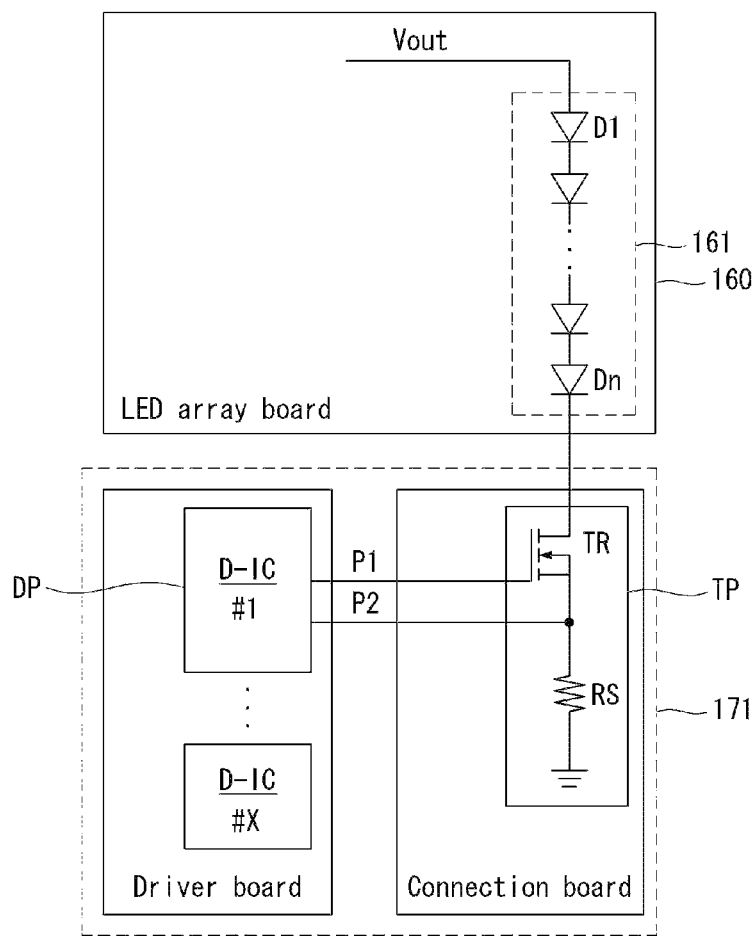
FIG. 6 is a schematic view for explaining the configuration of boards according to an exemplary embodiment of the present invention.

As shown in FIG. 6, to increase shared use of the device, the transistor part TP for driving some LED array 161 of the LED array 160 and the transistor driving part DP for driving the transistor part TP are separated and formed on different boards. That is, the LED array 160 is formed on an LED array board, the transistor part TP is formed on a connection board, and the transistor driving part DP is formed on a driver board.

By providing different boards as shown in FIG. 6, it is possible to increase shared use of the device, with regard to a dual type LED array 160 classified into LED arrays 161 and 162 on one side and LED arrays 163 and 164 on the other side, as shown in FIG. 7, and a direct type LED array 160 having first to 8th LED arrays 161 to 168 disposed relative to a central area CA.

Hereinafter, an arrangement example of boards according to an exemplary embodiment will be described.

Figure 9:
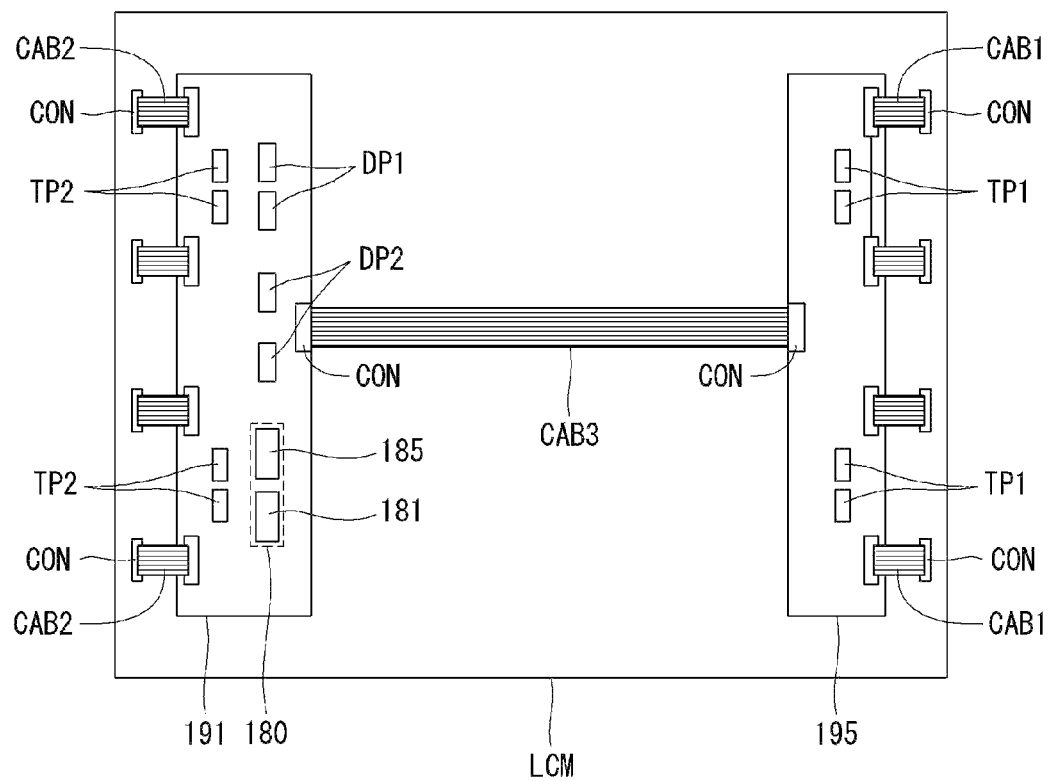
FIG. 9 is an illustration of the arrangement of boards according to an exemplary embodiment of the present invention.

As shown in FIG. 9, a driver board 191 and a connection board 195 are positioned on the back surface of a display module LCM. The driver board 191 and the connection board 195 are attached to the back surface of the display module LCM. The display module LCM comprises the gate driver 130, the data driver 140, the liquid crystal panel 150, and the LED array 160, as explained in FIG. 1.

A first transistor part TP1 for driving a part of the LED array, for example, the 5th to 8th LED arrays 165 to 168 of FIG. 8, is formed on the connection board 195.

A second transistor part TP2 for driving another part of the LED array, for example, the 1th to 4th LED arrays 161 to 164, is formed on the driver board 191. Moreover, first and second driving parts DP1 and DP2 for controlling the second transistor part TP2 and the first transistor part TP1 formed on the connection board 195 are formed on the driver board 191. Further, an LED controller 180 comprising the PWM unit 181 and MCU 185 for controlling the first and second driving parts DP1 and DP2 is formed on the driver board 191.

The first transistor part TP1 of the connection board 195 and the second transistor part TP2 of the driver board 191 each comprise a transistor for driving the LEDs included in a part and another part of the LED array and a passive element (see FIG. 6).

The connection board 195 comprises a first connecting part CAB1 in the form of a flexible cable which is connected to a part of the LED array. One side of the first connecting part CAB1 is fastened to a connector CON formed on the connection board 195, and the other side thereof is fastened to a connector formed on the back surface of the display module LCM. Alternatively, a connecting hole, instead of a connector, may be formed on the back surface of the display module LCM to be connected to a part of the LED array.

The driver board 191 comprises a second connecting part CAB2 in the form of a flexible cable connected to another part of the LED array and a third connecting part CABS in the form of a flexible cable connected to the connection board 195. One side of the second connecting part CAB2 is fastened to a connector CON formed on the drive board 191, and the other side thereof is fastened to a connector formed on the back surface of the display module LCM. Alternatively, a connecting hole, instead of a connector, may be formed on the back surface of the display module LCM to be connected to another part of the LED array. One side of the third connecting part CAB3 is fastened to a connector CON formed on the driver board 191, and the other side thereof is fastened to a connector CON formed on the connection board 195.

As explained in FIGS. 6 and 7, the first and second transistor parts TP1 and TP2 and the first and second driving parts DP1 and DP2 may have a 2-pin or 3-pin connection line structure. Accordingly, the number of wiring lines included in the flexible cable of the third connecting part CAB3 differs according to the connection line structure, and the number of connector pins also differs according to the connection line structure. That is, the 2-pin connection lines can achieve reductions in the number of wiring lines included in the flexible cable and the number of connector pins, as compared to the 3-pin connection line structure.

Figure 10:
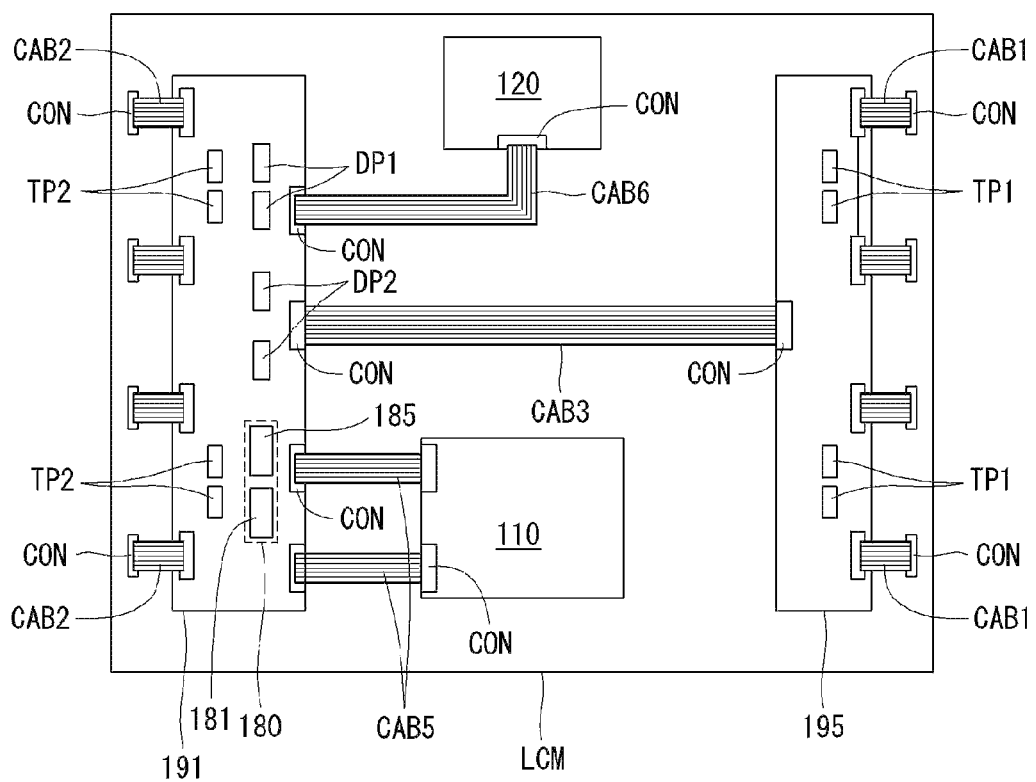
FIG. 10 is an illustration of the arrangement of a board with an image processor and a board with a timing controller, in addition to the arrangement shown in the illustration of FIG. 9.

As shown in FIG. 10, an image board with the image processor 110 and a t-con board with the timing controller 120 are further attached to the back surface of the display module LCM. The image board is connected to the driver board 191 through a fifth connecting part CAB5. One side and the other side of the fifth connecting part CAB5 are fastened to a connector formed the image board and a connector formed on the driver board 191, respectivley. The t-con board is connected to the drive board 191 through a sixth connecting part CAB6. One side and the other side of the sixth connecting part CAB6 are fastened to a connector formed on the t-con board and a connector formed on the driver board 191, respectively.

Hereinafter, an arrangement example of boards according to another exemplary embodiment will be described.

Figure 11:
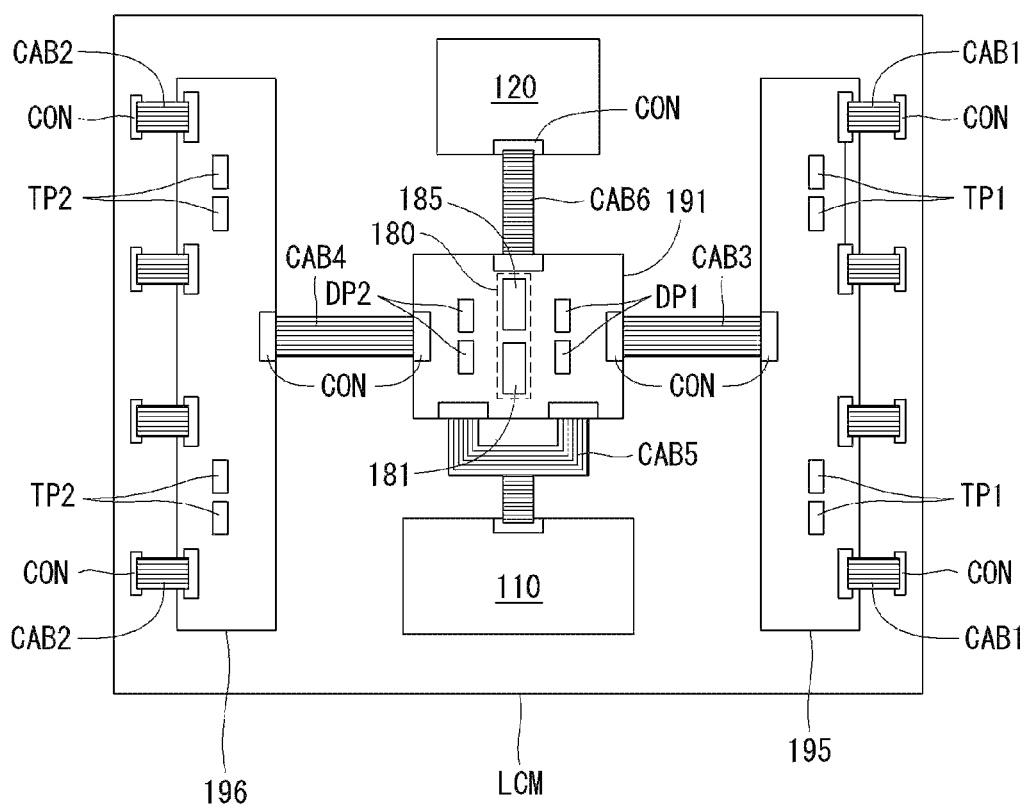
FIG. 11 is an illustration of the arrangement of boards according to another exemplary embodiment of the present invention.

As shown in FIG. 11, a driver board 191 and first and second connection boards 195 and 196 are positioned on the back surface of the display module LCM. The driver board 191 and the first and second connection boards 195 and 196 are attached to the back surface of the display module LCM. The display module LCM comprises the gate driver 130, the data driver 140, the liquid crystal panel 150, and the LED array 160, as explained in FIG. 1.

A first transistor part TP1 for driving a part of the LED array, for example, the 5th to 8th LED arrays 165 to 168 of FIG. 8, is formed on the first connection board 195. A second transistor part TP2 for driving another part of the LED array, for example, the 1th to 4th LED arrays 161 to 164, is formed on the second connection board 191.

Moreover, first and second driving parts DP1 and DP2 for controlling the first transistor part TP1 of the first connection board 195 and the second transistor part TP2 of the second connection board 196 are formed on the driver board 191. Further, an LED controller 180 comprising the PWM unit 181 and MCU 185 for controlling the first and second driving parts DP1 and DP2 is formed on the driver board 191.

The first transistor part TP1 of the first connection board 195 and the second transistor part TP2 of the second connection board 196 each comprise transistor for driving the LEDs included in a part and another part of the LED array and a passive element (see FIG. 6).

The first connection board 195 comprises a first connecting part CAB1 in the form of a flexible cable which is connected to a part of the LED array. One side of the first connecting part CAB1 is fastened to a connector CON formed on the first connection board 195, and the other side thereof is fastened to a connector formed on the back surface of the display module LCM. Alternatively, a connecting hole, instead of a connector, may be formed on the back surface of the display module LCM to be connected to a part of the LED array.

The second connection board 196 comprises a second connecting part CAB2 in the form of a flexible cable connected to another part of the LED array. One side of the second connecting part CAB2 is fastened to a connector CON formed on the drive board 191, and the other side thereof is fastened to a connector formed on the back surface of the display module LCM. Alternatively, a connecting hole, instead of a connector, may be formed on the back surface of the display module LCM to be connected to another part of the LED array.

The driver board 191 comprises a third and a fourth connecting part CAB3, CAB4 in the form of a flexible cable connected to the first and second connection boards 195 and 196. One side of the third and the fourth connecting part CAB3, CAB4 is fastened to a connector CON formed on the driver board 191, and the other side thereof is fastened to a connector CON formed on the first and second connection board 195, 196 respectively.

As explained in FIGS. 6 and 7, the first and second transistor parts TP1 and TP2 and the first and second driving parts DP1 and DP2 may have a 2-pin or 3-pin connection line structure. Accordingly, the number of wiring lines included in the flexible cable of the third connecting part CABS differs according to the connection line structure, and the number of connector pins also differs according to the connection line structure. That is, the 2-pin connection lines can achieve reductions in the number of wiring lines included in the flexible cable and the number of connector pins, as compared to the 3-pin connection line structure.

An image board with the image processor 110 and a t-con board with the timing controller 120 are further attached to the back surface of the display module LCM. The image board is connected to the driver board 191 through a fifth connecting part CABS. One side and the other side of the fifth connecting part CABS are fastened to a connector formed the image board and a connector formed on the driver board 191, respectively. The fifth connecting part CABS may have Y-shape or T-shape. The t-con board is connected to the drive board 191 through a sixth connecting part CAB6. One side and the other side of the sixth connecting part CAB6 are fastened to a connector formed on the t-con board and a connector formed on the driver board 191, respectively.

Figure 12:
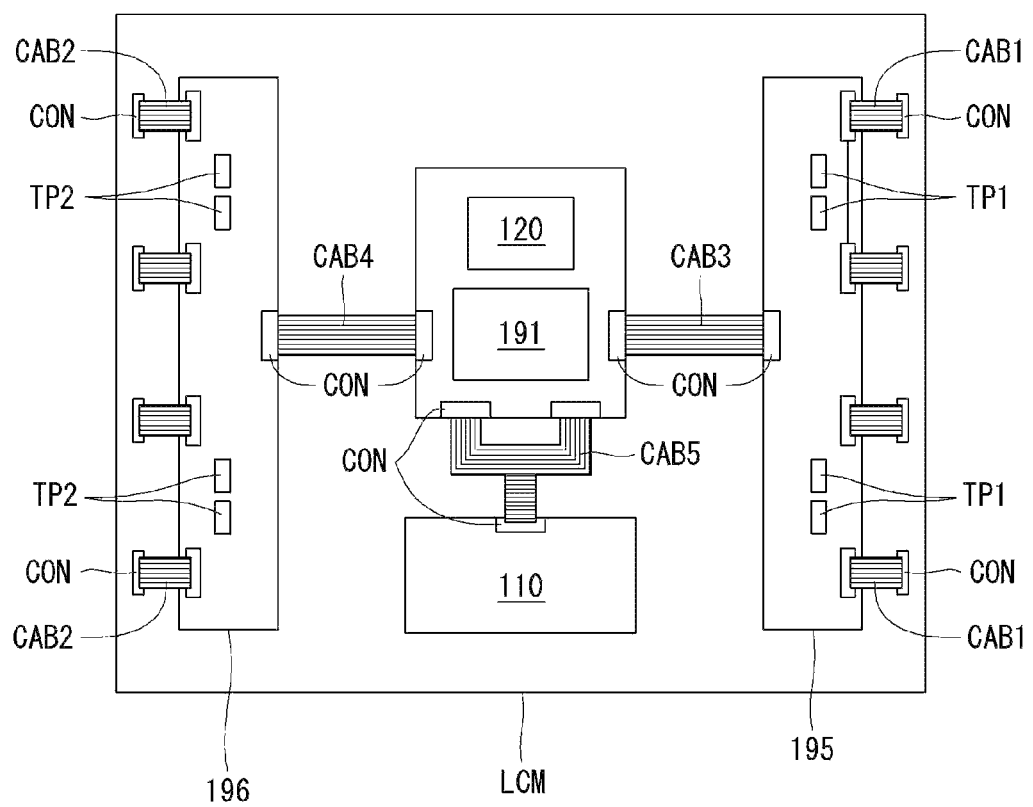
FIG. 12 is an illustration of the arrangement of boards according to yet another exemplary embodiment of the present invention.

As shown in FIG. 12, the driver board 191 and the t-con board with the timing controller 120 may be configured as an integrated board. With this structure, the sixth connecting part CAB6 connecting the t-con board and the driver board 191 can be omitted, resulting in a cost reduction.

The exemplary embodiment is not limited to the above-described structure, and the driver board 191 and the image board may be configured as an integrated board, or the driver board 191, the t-con board, and the image board may be configured as an integrated board.

By integrating one or more boards using the structure of this exemplary embodiment, connecting parts for connecting the boards may be omitted, and the problem of impedance matching, which is required in a connection method using a connecting part and may result in signal distortion, can be solved.

As seen from above, the exemplary embodiment of the present invention can eliminate the difficulty of having to design and develop a new driver board each time the structure of the backlight unit is changed (such as an increase or decrease in the number of LED blocks) by forming a transistor part for driving an LED array on a separate board and enabling shared use of a transistor driving part. Moreover, the exemplary embodiment of the present invention can increase the degree of freedom of a device configuration and make variations of boards as shared use of the transistor driving part is enabled, thereby achieving a cost reduction.

What is claimed is:

1. A liquid crystal display comprising:
a display module comprising a liquid crystal panel and an LED array providing light to the liquid crystal panel;
a connection board comprising a first transistor part for driving a part of the LED array; and
a driver board comprising a second transistor part for driving another part of the LED array and first and second driving parts that control the second transistor part and the first transistor part formed on the connection board.

2. The liquid crystal display of claim 1, wherein the first and second transistor parts each comprise a transistor for driving the LEDs included in a part and another part of the LED array and a passive element.

3. The liquid crystal display of claim 2, wherein the first and second transistor parts and the first and second driving parts have a 2-pin or 3-pin connection line structure.

4. The liquid crystal display of claim 1, wherein the connection board comprises a first connecting part attached to the back surface of the display module and connected to a part of the LED array.

5. The liquid crystal display of claim 1, wherein the driver board comprises a second connecting part connected to another part of the LED array and a third connecting part connected to the connection board.

6. A liquid crystal display comprising:
a display module comprising a liquid crystal panel and an LED array providing light to the liquid crystal panel;

a first connection board comprising a first transistor part for driving a part of the LED array;

a second connection board comprising a second transistor part for driving another part of the LED array; and a driver board comprising first and second driving parts that control the first and second transistor parts formed on the first and second connection boards.

7. The liquid crystal display of claim 6, wherein the first and second transistor parts each comprise a transistor for driving the LEDs included in a part and another part of the LED array and a passive element.

8. The liquid crystal display of claim 6, wherein the drive board is attached to the center of the back surface of the display module.

9. The liquid crystal display of claim 6, wherein the first and second connection boards respectively comprise first and second connecting parts attached to one side and the other side of the back surface of the display module and connected to a part and another part of the LED array, and respectively comprise third and fourth connecting parts connected to the drive board.

10. The liquid crystal display of claim 6, wherein the first and second transistor parts and the first and second driving parts have a 2-pin or 3-pin connection line structure.

* * * * *